United States Patent
Iwai et al.

(10) Patent No.: US 7,023,473 B2
(45) Date of Patent: Apr. 4, 2006

(54) CAMERA CALIBRATION DEVICE AND METHOD, AND COMPUTER SYSTEM

(75) Inventors: Yoshiaki Iwai, Tokyo (JP); Takayuki Yoshigahara, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 11/104,691

(22) Filed: Apr. 13, 2005

(65) Prior Publication Data

US 2005/0185049 A1    Aug. 25, 2005

Related U.S. Application Data (63) Continuation of application No. 09/905,450, filed on Jul. 13, 2001.

(30) Foreign Application Priority Data

Jul. 13, 2000    (JP)    ............................ P2000-212381

(51) Int. Cl.
*H04N 17/00*    (2006.01)

(52) U.S. Cl. ................................... 348/187

(58) Field of Classification Search ........ 348/187–192, 348/180–181, 47, 48, 201, 135, 137; 382/154, 382/266, 268, 275, 289

See application file for complete search history.

(56) References Cited

U.S. PATENT DOCUMENTS

| | | | | |
|---|---|---|---|---|
| 4,583,117 A * | 4/1986 | Lipton et al. | ................. | 348/47 |
| 5,003,166 A * | 3/1991 | Girod | ..................... | 250/201.4 |
| 5,625,408 A * | 4/1997 | Matsugu et al. | ............... | 348/42 |
| 5,638,461 A * | 6/1997 | Fridge | ........................ | 382/141 |
| 5,694,483 A * | 12/1997 | Onoguchi | ................... | 382/154 |
| 5,821,993 A * | 10/1998 | Robinson | ..................... | 348/187 |
| 6,014,163 A * | 1/2000 | Housekeeper | ................. | 348/47 |
| 6,031,941 A * | 2/2000 | Yano et al. | ................. | 382/276 |
| 6,101,455 A * | 8/2000 | Davis | ......................... | 702/94 |
| 6,118,475 A * | 9/2000 | Iijima et al. | .................. | 348/42 |
| 6,377,701 B1 * | 4/2002 | Ohki | .......................... | 382/154 |
| 6,414,709 B1 * | 7/2002 | Palm et al. | ................... | 348/47 |
| 6,437,823 B1 * | 8/2002 | Zhang | ........................ | 348/187 |
| 6,459,481 B1 * | 10/2002 | Schaack | .................. | 356/241.1 |
| 6,621,921 B1 * | 9/2003 | Matsugu et al. | ............ | 382/154 |
| 6,798,446 B1 * | 9/2004 | Maggi | .................... | 348/207.99 |
| 6,816,187 B1 * | 11/2004 | Iwai et al. | ................... | 348/187 |
| 6,963,428 B1 * | 11/2005 | Gann | ........................ | 358/474 |

* cited by examiner

*Primary Examiner*—Paulos M. Natnael
(74) *Attorney, Agent, or Firm*—Bell, Boyd & Lloyd LLC (57) ABSTRACT

A camera calibration device capable of simply calibrating a stereo system consisting of a base camera and a detection camera. First, distortion parameters of the two cameras necessary for distance measurement are presumed by the use of images obtained by shooting a patterned object plane with the base camera and the reference camera at three or more view points free from any spatial positional restriction, and projective transformation matrixes for projecting the images respectively onto predetermined virtual planes are calculated. Then internal parameters of the base camera are calculated on the basis of the projective transformation matrixes relative to the images obtained from the base camera. Subsequently the position of the shot plane is presumed on the basis of the internal parameter of the base camera and the images obtained therefrom, whereby projection matrixes for the detection camera are calculated on the basis of the plane position parameters and the images obtained from the detection camera. According to this device, simplified calibration can be achieved stably without the necessity of any exclusive appliance.

8 Claims, 9 Drawing Sheets

SHOT IMAGE FROM DETECTION CAMERA

FIG. 8A

SHOT IMAGE FROM BASE CAMERA

US 7,023,473 B2

CAMERA CALIBRATION DEVICE AND METHOD, AND COMPUTER SYSTEM

CROSS REFERENCE TO RELATED APPLICATIONS

The present application is a continuation of U.S. patent application Ser. No. 09/905,450 filed on Jul. 13, 2001, and which claims priority to Japanese Patent Application No. P2000-212381 filed on Jul. 13, 2000, the above-referenced disclosures of which are herein incorporated by reference.

BACKGROUND OF THE INVENTION

1. Field of the Invention

The present invention relates to a camera calibration method and device for calculating parameters representative of the characteristics of a camera and, more particularly, to such a method and device adapted for calculating parameters relative to a camera of a type which shoots an object to pick up an image thereof and outputs electronic image data. In addition, the present invention relates to a camera calibration method and device for calculating parameters necessary for distance measurement in stereographic camera calibration by the use of an arbitrary plane not restricted with regard to any spatial position.

2. Description of the Prior Art

Most of the existing cameras are so designed as to perform center projection with a pinhole camera model. Center projection is capable of forming a projected image by disposing the chroma value of a point M on the surface of a three-dimensional object, at an intersection of a straight line (termed "sight line" also), which passes through a projection center C and the point M on the object surface, and a projection screen of the camera. In such center projection, the image of an object is projected to be larger with approach to the projection center C of the camera, and the image is projected to be smaller with receding from the projection center C while the object is dimensionally the same.

When the object to be shot is a plane, it is obvious, geometric-optically, that the image obtained by shooting the object in an oblique direction to the front thereof becomes a projected image formed through projective transformation of the image shot from a position opposite to the front. In the technical field of image processing, it is widely known that a projected image is obtained through projective transformation of a front image by a projective transformation matrix H. For example, in case a front image is composed of electronic image data captured by a digital camera, a projected image equal to one shot from a desired direction (sight line) can be calculated relatively fast with facility through projective transformation of the captured front image. For example, in Kenichi Kanetani, "Image Understanding" (Morikita Shuppan, 1990), there is described a point where an original image can be transformed by a projective transformation matrix into an image visible at a different angle. Such projective transformation of a shot image can be performed fast by the use of, e.g., computer resources.

The geometric-optic attribute related to projective transformation also can be applied to distance measurement of an object based on "stereography." Here, the stereography is defined as a method of measuring, according to the principle of trigonometrical measurement, the distance between the projection center and each point of a scene (i.e., an image to be shot by the use of images shot) from a number of view points (projection centers) having a predetermined positional relationship.

Figure 7:
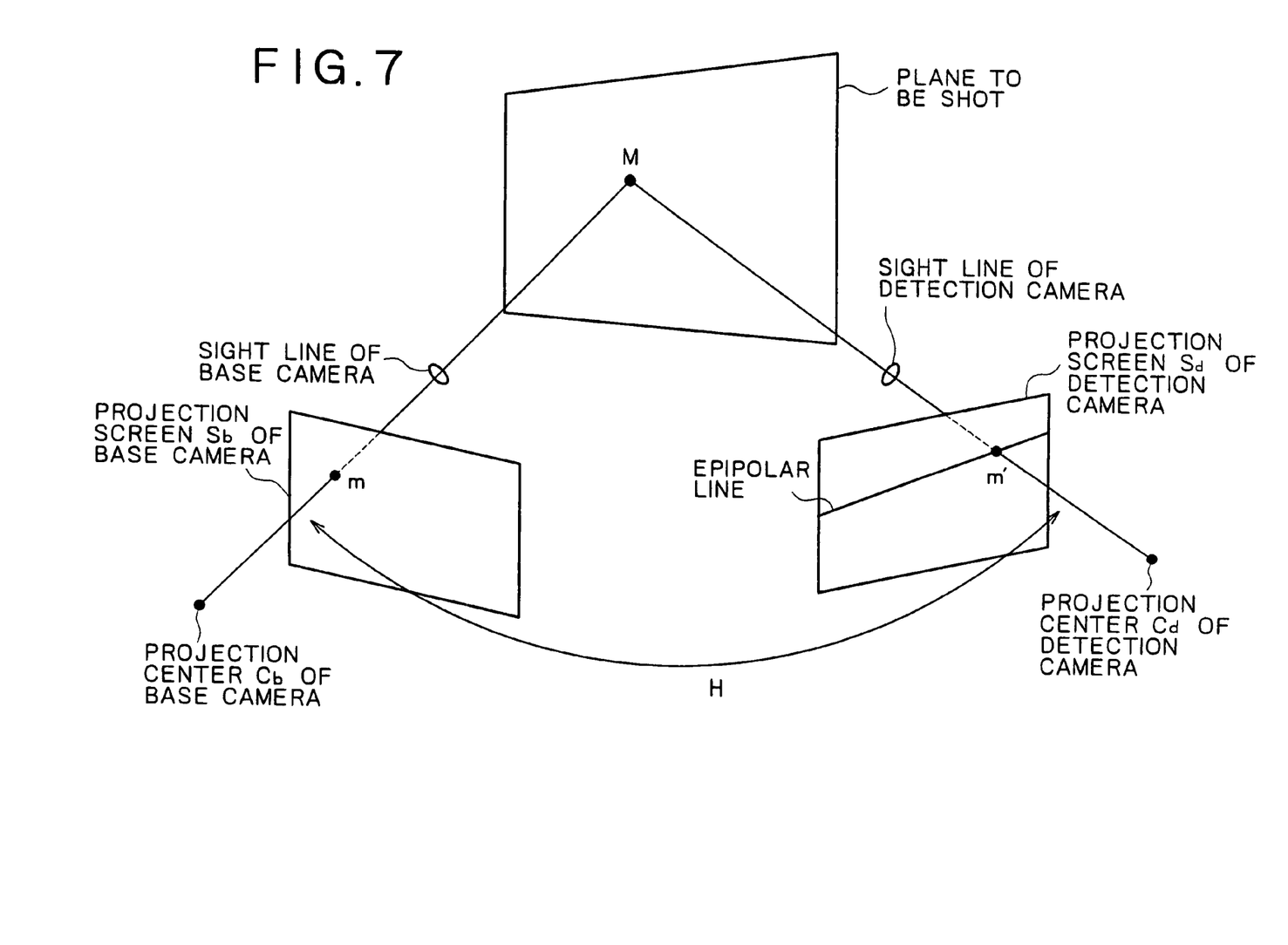
FIG. 7 shows the typical positions of a base camera and a detection camera disposed with respect to an object to be shot.

It is supposed in this specification that, for the sake of explanatory convenience, stereography is carried out by the use of two cameras representing two view points. One camera is employed as a base camera which shoots an object from a position exactly opposite to the front thereof and then outputs a base image. Meanwhile, the other camera is employed as a detection camera which shoots the object from an oblique direction and then outputs a detection image. FIG. 7 typically shows how the base camera and the detection camera are disposed with respect to the image plane, and FIGS. 8A and 8B typically show a base image and a detection image obtained by shooting a substantially square pattern with the base camera and the detection camera, respectively.

In the image picked up by the base camera, as shown in FIG. 7, a point M is observed at an intersection m of a straight line, which passes through a point M on the object plane to be shot and a projection center $C_b$ of the base camera, with a projection screen $S_b$ of the base camera. The straight line passing through the point M and the projection center $C_b$ denotes a sight line of the base camera. Meanwhile, in the image picked up by the detection camera, a point M is observed at an intersection m' of a straight line, which passes through the point M and a projection center $C_b$ of the detection camera, with a projection screen $S_d$ of the detection camera. The straight line passing through the point M and the projection center $C_d$ of the detection camera denotes a sight line of the detection camera.

The sight line of the base camera is observed as a straight line on the projection screen of the detection camera, and this straight line is termed "epipolar line."

Figure 8A:
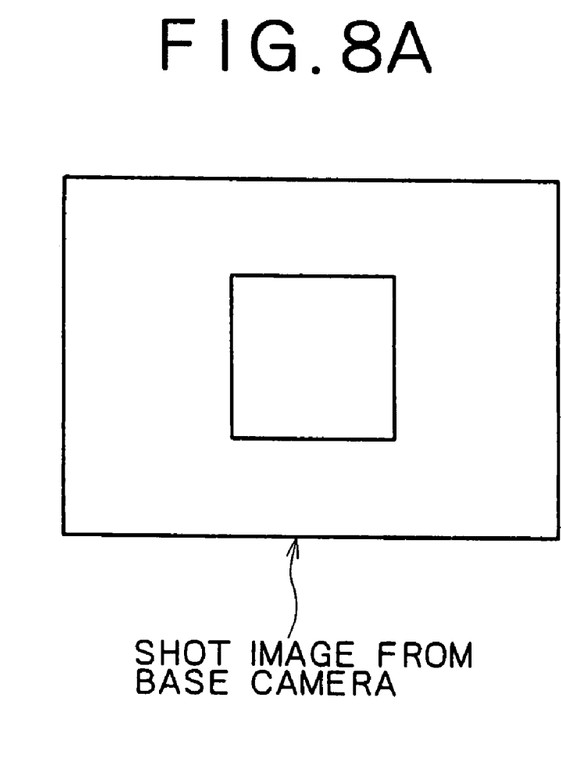
FIGS. 8A and 8B illustrates images obtained by shooting a substantially square pattern with a base camera and a detection camera respectively.
Figure 8B:
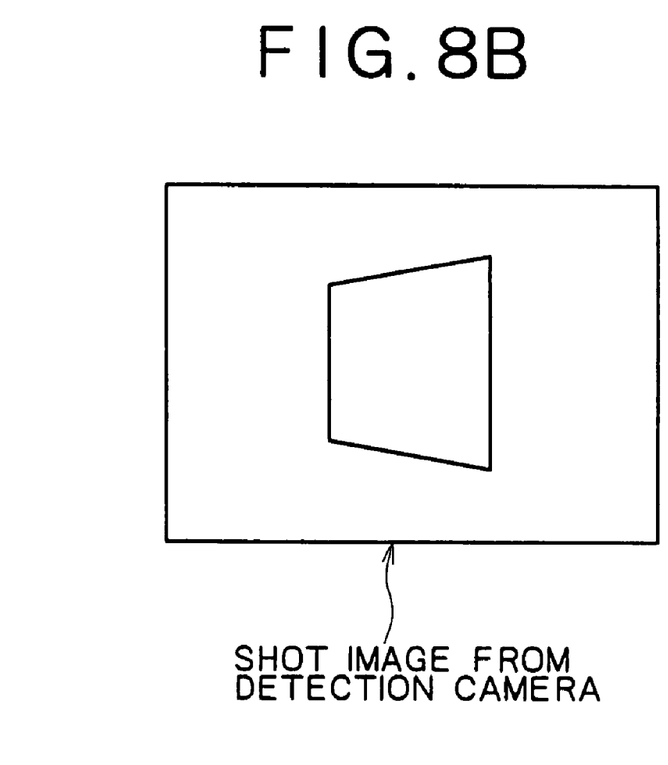

In the example shown in FIGS. 7, 8A and 8B, the image shot by the base camera positioned exactly opposite the substantially square pattern becomes a square, whereas the image shot by the detection camera positioned obliquely to the pattern appears to be trapezoidal since the side having a longer distance from the view point is contracted. This is based on the fundamental characteristic of center projection that any object of the same dimensions is projected to form a larger image with approach to the projection center C of the camera, and is projected to be smaller with receding from the projection center C.

As described above, in case the object to be shot is a plane, the image from the detection camera corresponds to an image obtained through projective transformation of the image from the base camera. That is, the following condition is satisfied between the point m $(x_b, y_b)$ in the image from the base camera and the point m' $(x_d, y_d)$ in the image from the detection camera. In the equation given below, H denotes a 3×3 projective transformation matrix.

$$m'=H'm$$

The projective transformation matrix H implicitly includes internal and external parameters of the camera and a plane equation, and has eight degrees of freedom which are left in scale factors. In "Image Understanding" written by Kenichi Kanetani (Morikita Shuppan, 1990), there is a description that, between a base image and a reference image to be compared, points of mutual correspondence can be found through projective transformation.

The sight line of the base camera appears as a straight line termed an epipolar line on the projection screen of the detection camera (as explained above with reference to FIG. 7). The point M existing on the sight line of the base camera appears at the same observation point m on the projection screen of the base camera, regardless of the depth of point M; i.e., the distance to the base camera. Meanwhile, the observation point m' of point M on the projection screen of the detection camera appears, on the epipolar line, at a position proportional to the distance between the base camera and the observation point M.

Figure 9:
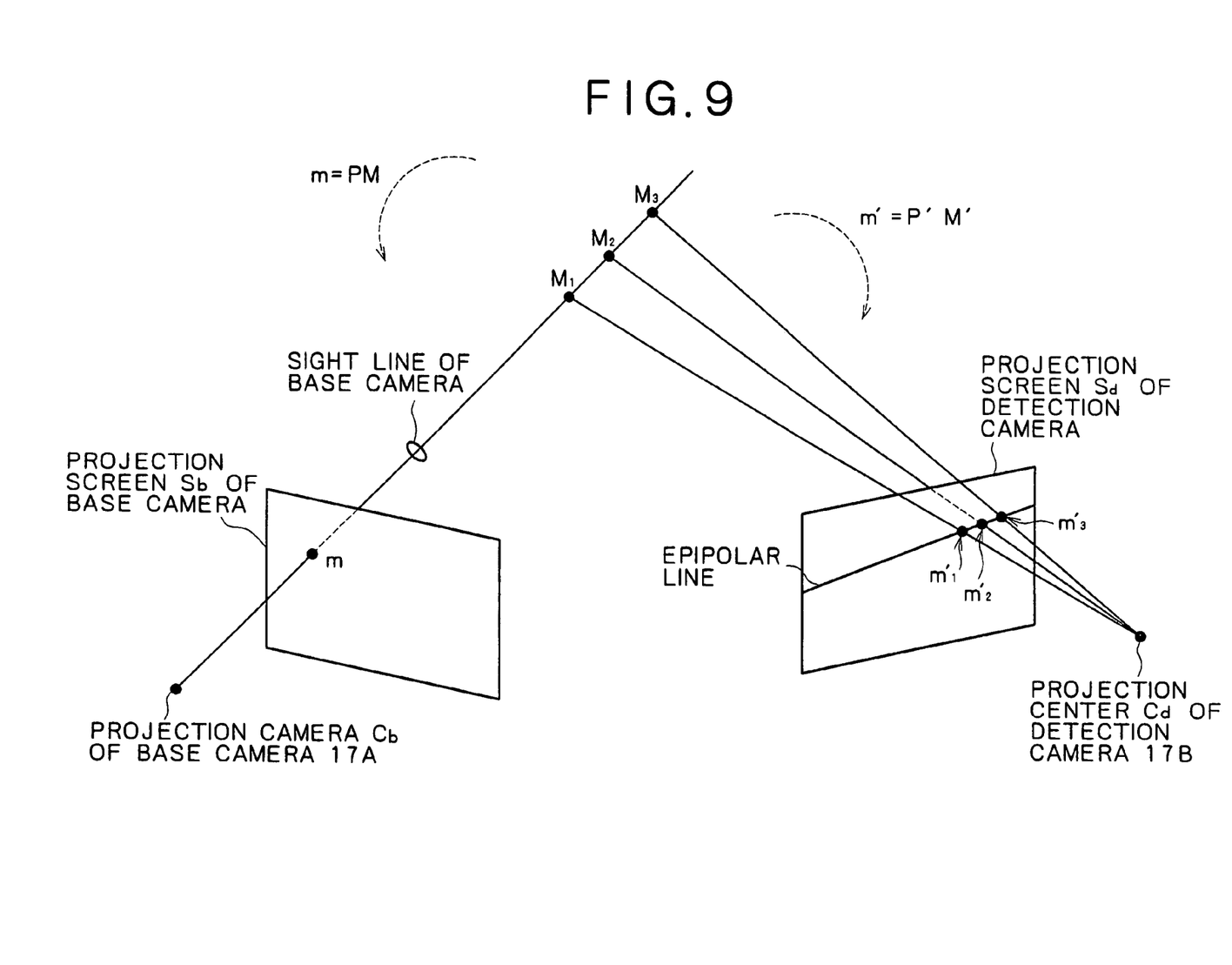
FIG. 9 illustrates an epipolar line and an observation point m' in a reference image to be compared.

FIG. 9 illustrates the epipolar line and the observation points m' on the projection screen of the detection camera. As shown in this diagram, the observation point in the reference image to be compared is shifted to $m'_1$, $m'_2$, $m'_3$ in accordance with positional changes of the point M to $M_1$, $M_2$, $M_3$. In other words, the position on the epipolar line corresponds to the depth of the observation point M.

The observation point m' relevant to the observation point m of the base camera is searched on the epipolar line by utilizing the geometric-optic attribute mentioned above, so that it becomes possible to measure the distance between the base camera and the point P. This is the fundamental principle of "stereography."

However, generation of a perspective image on the basis of the front image obtained by actually shooting a desired object, or measurement of the distance to the object from a number of images obtained by a number of cameras according to stereography, is premised on the condition that the imaging optical system of each camera has a characteristic which is completely coincident with a theoretical one. For this reason, it is necessary to execute predetermined correction with regard to the image acquired by actual shooting. For example, a camera lens generally has a distortion parameter, and its observation point in the image is positionally displaced from a theoretical one. Therefore, unless calculating the parameter peculiar to the camera and correcting the image data in accordance with such parameter in projective transformation, it is impossible to obtain an accurate projected image from the front image and, consequently, accurate measurement of the depth fails to be carried out by stereography.

The camera has, in addition to such a distortion parameter of its lens, internal parameters representing the camera characteristics, and external parameters representing the three-dimensional position of the camera. Generally, a method of calculating the camera parameters is termed "camera calibration." Although a variety of techniques for camera calibration have been proposed heretofore, there is no established one in the present circumstances. In general, some exclusive appliances and so forth are required due to restriction of data for calibration, thus rendering the processing very complicated.

The most typical camera calibration is a method of first shooting a calibration pattern which consists of a number of reference points whose three-dimensional spatial positions are known, and then calculating the entire camera parameters simultaneously inclusive of internal parameters, external parameters and distortion parameter. The technique of such camera calibration is disclosed in, e.g., Roger Y. Tsai, "An Efficient and Accurate Camera Calibration Technique for 3D Machine Vision" (1986, IEEE). However, for carrying out the method proposed by Tsai, it is necessary to prepare a calibration pattern where accurate reference points are plotted. Further, a mechanism for exactly positioning the reference points is also required.

In order to reduce such restrictions of data, there are recently proposed some improved camera calibration methods suing an arbitrary plane without any positional restriction.

For example, a method of calculating internal parameters of a camera is disclosed in Zhengyou Zhang, "A Flexible New Technique for Camera Calibration", Microsoft Research Technical Report, 1999 (http://www.research.microsoft.com/zhang/), wherein no description is given for providing parameters relative to stereography.

Briefing the above, it is highly demanded now to create an improved procedure which carries out camera calibration in a stereo system merely by shooting a known planar pattern with cameras from different directions without any positional restriction on the plane.

SUMMARY OF THE INVENTION

It is, therefore, an object of the present invention to provide a superior camera calibration method and device capable of calculating parameters representing characteristics of cameras.

Another object of the present invention is to provide a superior camera calibration method and device adapted for simply carrying out camera calibration in a stereo system by the mere shooting of a known planar pattern with cameras from different directions without any positional restriction on the plane.

According to a first embodiment of the present invention, there is provided a camera calibration device for calibrating a stereo system which consists of a base camera and a detection camera. The calibration device includes an image holding device for holding images obtained by shooting a plane, where a known pattern is drawn, with the base camera and the detection camera at three or more view points free from any spatial positional restriction; and a parameter calculating device for calculating parameters necessary for distance measurement in the stereo system on the basis of the images held by the image holding device.

The parameter calculating device includes a first part for presuming distortion parameters of the base camera and the detection camera by the use of the shot images; a second part for calculating projective transformation matrixes to project the images respectively onto predetermined virtual planes; a third part for calculating internal parameters of the base camera on the basis of the projective transformation matrixes obtained by the second part with regard to the images from the base camera; a fourth part for presuming the position of the shot plane on the basis of the internal parameters of the base camera calculated by the third part, and also on the basis of the images obtained from the base camera; and a fifth part for calculating projection matrixes for the detection camera on the basis of parameters of the plane position presumed by the fourth part, and also on the basis of the images obtained from the detection camera.

The camera calibration device further includes a parameter correcting device for optimizing the plane position parameters and the projection matrixes for the detection camera on the basis of more than two images obtained from the base camera and the detection camera and held by the image holding device.

The parameter correcting device includes a sixth part for calculating projective transformation matrixes to project the images respectively onto predetermined virtual planes; a seventh part for presuming the position of the shot plane on the basis of the internal parameters of the base camera and also the images obtained from the base camera; an eighth part for calculating projection matrixes for the detection camera on the basis of parameters of the plane position presumed by the seventh part, and also on the basis of the images obtained from the detection camera; and a ninth part for optimizing the plane position parameters and the projection matrixes for the detection camera on the basis of the shot images.

The distortion parameters and/or the projective transformation matrixes may be calculated through a process of image registration which registers the individual images in a manner to form a predetermined synthetic image. In such image registration, the distortion parameters can be presumed with relatively high stability even when the position of the shot pattern is local.

According to a second embodiment of the present invention, there is provided a camera calibration method for calibrating a stereo system, which consists of a base camera and a detection camera, by the use of images obtained by shooting a plane, where a known pattern is drawn, with the individual cameras at three or more view points free from any spatial positional restriction. The calibration method includes a first step of presuming distortion parameters of the base camera and the detection camera by the use of the images thus obtained; a second step of calculating projective transformation matrixes to project the images respectively onto predetermined virtual planes; a third step of calculating internal parameters of the base camera on the basis of the projective transformation matrixes obtained at the second step with regard to the images from the base camera; a fourth step of presuming the position of the shot plane on the basis of the internal parameters of the base camera calculated at the third step, and also on the basis of the images obtained from the base camera; and a fifth step of calculating projection matrixes for the detection camera on the basis of parameters of the plane position presumed at the fourth step, and also on the basis of the images obtained from the detection camera.

The camera calibration method further includes a parameter correcting step of optimizing the plane position parameters and the projection matrixes for the detection camera on the basis of more than two images obtained from the base camera and the detection camera.

The parameter correcting step includes a sixth step of calculating projective transformation matrixes to project the images respectively onto predetermined virtual planes; a seventh step of presuming the position of the shot plane on the basis of the internal parameters of the base camera and the images obtained from the base camera; an eighth step of calculating projection matrixes for the detection camera on the basis of parameters of the plane position presumed at the seventh step, and also on the basis of the images obtained from the detection camera; and a ninth step of optimizing the plane position parameters and the projection matrixes for the detection camera on the basis of the shot images.

According to a third embodiment of the present invention, there is provided a storage medium where computer software is physically stored in a format readable by a computer. The software is so described as to execute, on a computer system, a processing routine of camera calibration for a stereo system, which consists of a base camera and a detection camera, by the use of images obtained by shooting a plane, where a known pattern is drawn, with the individual cameras at three or more view points free from any spatial positional restriction. The computer software includes a first step of presuming distortion parameters of the base camera and the detection camera by the use of the images thus obtained; a second step of calculating projective transformation matrixes to project the images respectively onto predetermined virtual planes; a third step of calculating internal parameters of the base camera on the basis of the projective transformation matrixes obtained at the second step with regard to the images from the base camera; a fourth step of presuming the position of the shot plane on the basis of the internal parameters of the base camera calculated at the third step, and also on the basis of the images obtained from the base camera; and a fifth step of calculating projection matrixes for the detection camera on the basis of parameters of the plane position presumed at the fourth step, and also on the basis of the images obtained from the detection camera.

The storage medium relative to the third embodiment of the present invention serves for physically providing computer software in a computer-readable format to, for example, a general-purpose computer which is capable of executing various program codes. This medium is a portable memory to be loaded removably, such as CD (Compact Disc), FD (Floppy Disc), MO (Magneto-Optical disc) or the like. It is technically possible also to provide computer software in a computer-readable format to a specific computer system via a transmission medium such as a network (regardless of wireless or cable).

This storage medium defines the structural or functional cooperative relationship between predetermined computer software and the storage medium for realizing the function of the predetermined computer software on a computer system. In other words, the cooperative action is exerted on the computer system by installing desired computer software in the computer system via the storage medium relative to the third embodiment of the present invention, hence achieving the same effects as those attained in the camera calibration device and method relative to the first and second embodiments of the present invention.

In the camera calibration device and method of the present invention, distortion parameters of a base camera and a detection camera are presumed by using the images obtained by the individual cameras at three or more view points free from any spatial positional restriction, and projective transformation matrixes for projecting the images onto virtual planes are calculated. Subsequently, internal parameters of the base camera are calculated on the basis of the projective transformation matrixes obtained with regard to the images from the base camera. Then the position of the shot plane is presumed on the basis of the images and the internal parameters of the base camera to thereby perform calculation of the projection matrixes for the detection camera on the basis of the plane position parameters and the images from the detection camera.

According to the camera calibration device and method of the present invention, simplified camera calibration can be achieved in stereography by the use of an arbitrary plane where no spatial positional restriction is existent. Consequently, an exclusive appliance is not required due to no restriction with regard to the positional relation of the shot plane.

More specifically, there is no restriction with respect to positions on the plane, since the requisite is merely to shoot a known pattern on the plane by cameras from different directions.

Although the pattern needs to be a known one, an exclusive appliance is not necessary to be prepared, so that it is possible to use, for example, a sheet of paper having a pattern outputted from a laser printer or the like and attached to a wall or plate.

Shooting the pattern is performed merely to obtain three images of the shot plane while moving the plane (such as plate) where the pattern is drawn (or attached) or moving the camera to pick up images, hence eliminating any great limitation relative to the shot object (data) and consequently achieving simplified calibration.

Additional features and advantages of the present invention are described in, and will be apparent from, the following detailed description of the preferred embodiment and the drawings.

DETAILED DESCRIPTION OF THE PREFERRED EMBODIMENTS

Prior to describing some preferred embodiments of the present invention, an explanation will be given on camera parameters used in this specification and also on a method of distance measurement carried out on the basis of such parameters.

In the following description, a point on an image is expressed as $$m=[u,v]^T$$

Similarly, a point in space is expressed as $$M=[x,y,z]^T$$

And the points in homogeneous coordinates are expressed respectively as $$\tilde{m} = [u, v, 1]T$$

$$\tilde{M} = [x, y, z]T$$

In this case, the relationship between the space point M and the image point m is represented by an equation given below.

$$s\tilde{m} = A \cdot [R, t] \cdot \tilde{M} \quad (1)$$
$$= P \cdot \tilde{M}$$

In the above equation, s denotes a scale factor, and a matrix [R,t] is termed an external parameter which signifies the position of a camera in space. R and t denote, respectively, a rotation matrix and a translation matrix of the image. And a matrix A is termed an internal parameter of a camera expressed by the following equation.

$$A = \begin{bmatrix} \alpha & \gamma & u0 \\ 0 & \beta & v0 \\ 0 & 0 & 1 \end{bmatrix} \quad (2)$$

In the above, (u0,v0) denotes the center of an image; $\alpha(=-f \cdot ku)$ and $\beta(=-f \cdot kv/\sin\theta)$ denote scale factors of the u-axis and v-axis respectively; and $\gamma(=f \cdot ku \cdot \cot\theta)$ denotes the torsion of the two axes. And a matrix $P=A \cdot [R,t]$ denotes a 3×4 projection matrix of the space point to be projected onto an image plane.

The foregoing description is concerned with transformation carried out under ideal conditions without consideration of any harmful influence derived from lens distortion. Actually, however, it is impossible to neglect the influence caused by such distortion, and therefore the lens distortion will also be included in the camera parameters. The positional relationship between point $m_d=[ud,vd]^T$ in distortion coordinates and point $m=[u,v]^T$ can be expressed as follows.

$$u=ud+(ud-cu) \cdot k \cdot rd^2$$
$$v=vd+(vd-cv) \cdot k \cdot rd2 \quad (3)$$

In this equation, $rd^2=(ud-cu)^2+(vd-cv)^2 sv^2$, and (cu, cv) denotes the center of distortion, and sv denotes an aspect ratio, respectively.

Hereinafter an explanation will be given on a method of distance measurement in stereography. As shown in FIG. 9, projection matrixes for a base camera and a detection camera are denoted by P and P' respectively, and points on a base image and a detection image are denoted by m and m' respectively. It is supposed in this case that the points on the individual images have already been corrected according to equation (3) to eliminate any harmful influence of distortion.

In measuring the distance to the point M, it is necessary to detect the point m' on the detection image corresponding to the point m on the base image. As shown in FIG. 9, the point m' is positioned on a straight line called an epipolar line as mentioned. Therefore, detection of the relevant point, which is on the reference image to be compared and corresponds to the point m, can be executed by a search on this straight line.

As described, the epipolar line is an aggregation of points obtained by projecting, onto the detection plane, points on a straight line passing through the center of the camera and the point m. In an exemplary case where the measurement in a spatial direction Z ranges from Z0 to Zn, the epipolar line passes through points $m_o'$ and $m_n'$ obtained by projection of points $M_0$ and $M_n$ corresponding to the respective distances. In an actual search, the point at a distance $Z_i$ is projected onto a detection image, and the similarity to the corresponding point on the base image is measured to thereby determine the mutual correspondence of the points between the images.

Next, an explanation will be given on a procedure for projecting a point $M_i$, which is at a distance $Z_i$ and is projected to the point m of the base camera, to a point $m_i'$ on the detection image. Any point on a sight line passing through the point m can be expressed as follows by the use of equation (1).

$$\tilde{M} = sP^+ \cdot \tilde{m} + p^*  \quad (4)$$

In the above equation, $P^+$ is an affine inverse matrix of P, and it is defined as $$P^+ = P^T(PP^T)^{-1} \quad (5)$$

Also in equation (4), p˙ is a vector satisfying the following equation, and actually denotes an optical center since it is always projected to the origin. In equation (6), ω is a four-dimensional vector.

$$P \cdot p^{\cdot} = 0$$

$$p\perp = (I - P^+ P)\omega \quad (6)$$

Equation (4) expresses the entire points passing through the optical center and the point m on the base image, and the scale factor can be determined with the distance set to $Z_i$, hence determining the spatial point $M_i$. Then it becomes possible to calculate the point $m_i'$ on the detection image by projecting the point Mi with the projection matrix P'.

Due to the procedure mentioned above, the distance to any spatial point can be measured by individually finding the parameters A, R, t, A', R' and t' of each camera, or by directly calculating the projection matrixes P and P', and further by calculating the distortion parameters k1, cu1, cv1, sv1, k2, cu2, cv2 and sv2 of each camera.

Hereinafter some preferred embodiments of the present invention will be described in detail with reference to the accompanying drawings.

Figure 1:
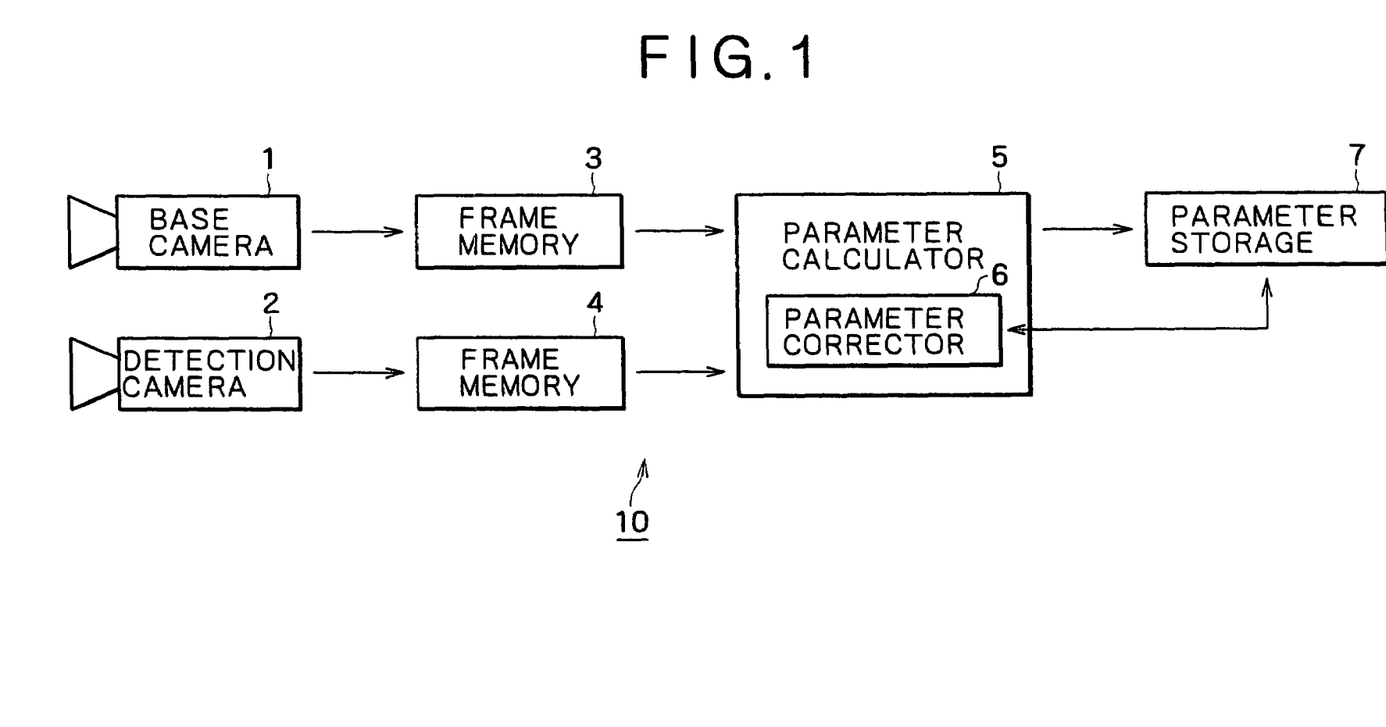
FIG. 1 shows a typical function structure of a camera calibration device embodying the present invention.

FIG. 1 shows a typical function structure of a camera calibration device 10 embodying the present invention. The camera calibration device 10 is capable of calculating parameters, which are necessary for distance measurement in stereography, on the basis of images obtained by shooting, from different view points, a plane where a known pattern is drawn.

A plane with a known pattern drawn thereon is shot by a base camera 1 and a detection camera 2. Gradation images obtained by such shooting are stored in frame memories 3 and 4, respectively.

In a parameter calculator 5, distortion parameters of the cameras 1 and 2 and also projection matrixes for these cameras are calculated out of the three images obtained by shooting the pattern from different view points, and then the values thereof are stored in a parameter storage 7.

Meanwhile, in a parameter corrector 6, the parameters stored in the parameter storage 7 are corrected on the basis of the two images obtained from the different view points (the parameters need to be calculated at least once for correction), and then the corrected parameters are stored in the parameter storage 7. The process in the parameter corrector 6 is executed by partially utilizing the process in the parameter calculator 5.

Figure 2:
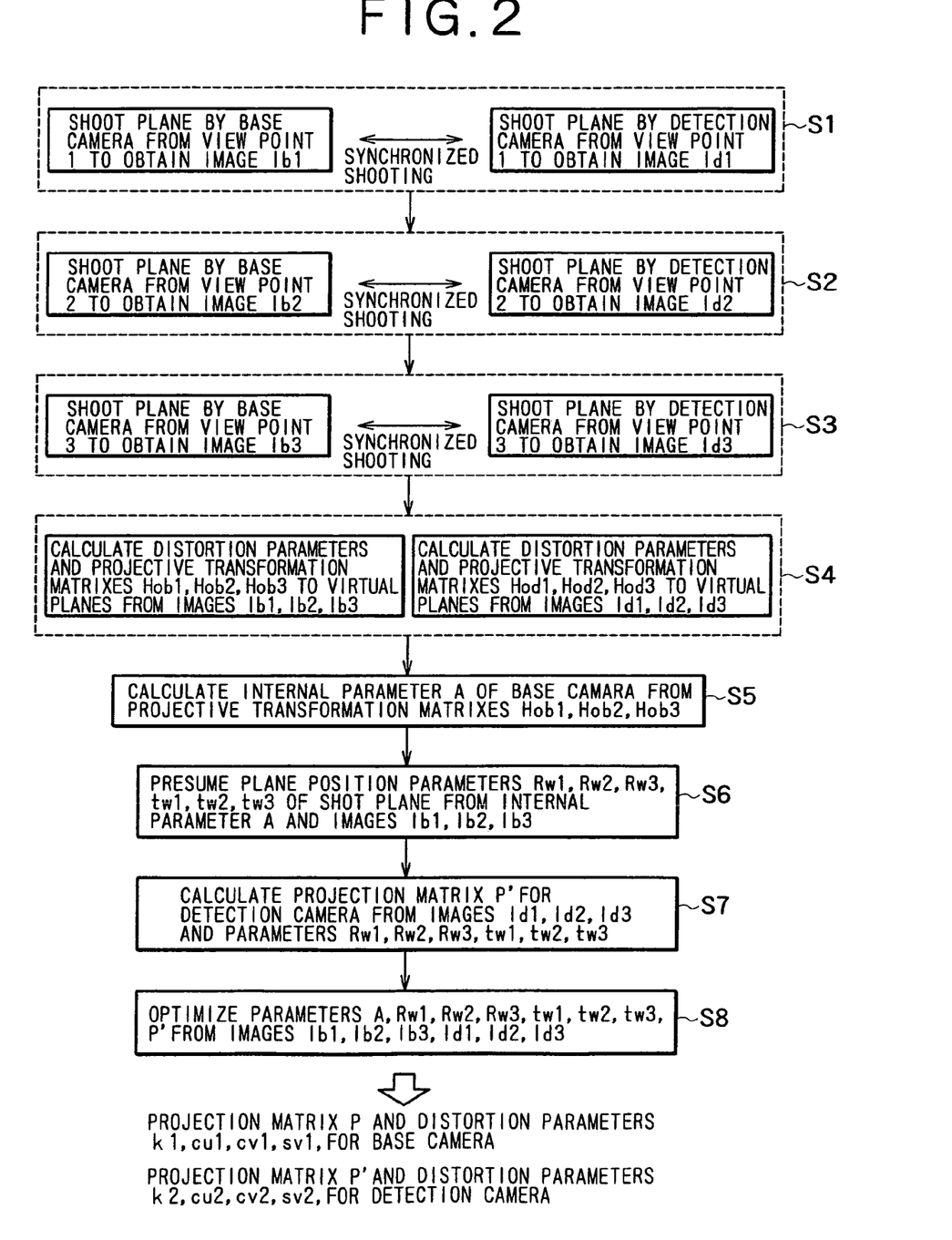
FIG. 2 is a flowchart showing a processing routine of parameter calculation executed in a parameter calculator.

FIG. 2 is a flowchart showing a processing routine of parameter calculation executed in the parameter calculator 5.

First, the pattern-drawn plane is shot from three different view points (steps S1 to S3). In such shooting, it is preferred that the base camera 1 and the detection camera 2 are synchronized with each other (even though synchronism is not kept therebetween, the respective shooting conditions, including the positional relationship to the pattern and so forth, need to be mutually coincident).

In shooting the plane, the requisite conditions are satisfied if the spatial positions of the plane (or view points) are not parallel with each other. Although there is no particular restriction with regard to the pattern to be shot, it is supposed that a black-and-white binary lattice pattern is used in the processing routine which will be described below in detail.

(1) Presumption of Distortion Parameters (Step S4)

Distortion parameters of the base camera 1 and the detection camera 2 are presumed by using the images obtained respectively from the cameras 1 and 2, and simultaneously projective transformation matrixes for a synthetic image are calculated.

The synthetic image is formed by reducing the dimensions of a virtual plane which is disposed in parallel with an X-Y plane in an XYZ coordinate system and at a position of Z=0, and its coordinates are in an XY coordinate system. The method of presuming distortion parameters employed here can be achieved by extending the camera calibration method disclosed in, e.g., Japanese Patent application No. Hei 11-161217 consigned already to the present applicant.

Figure 3:
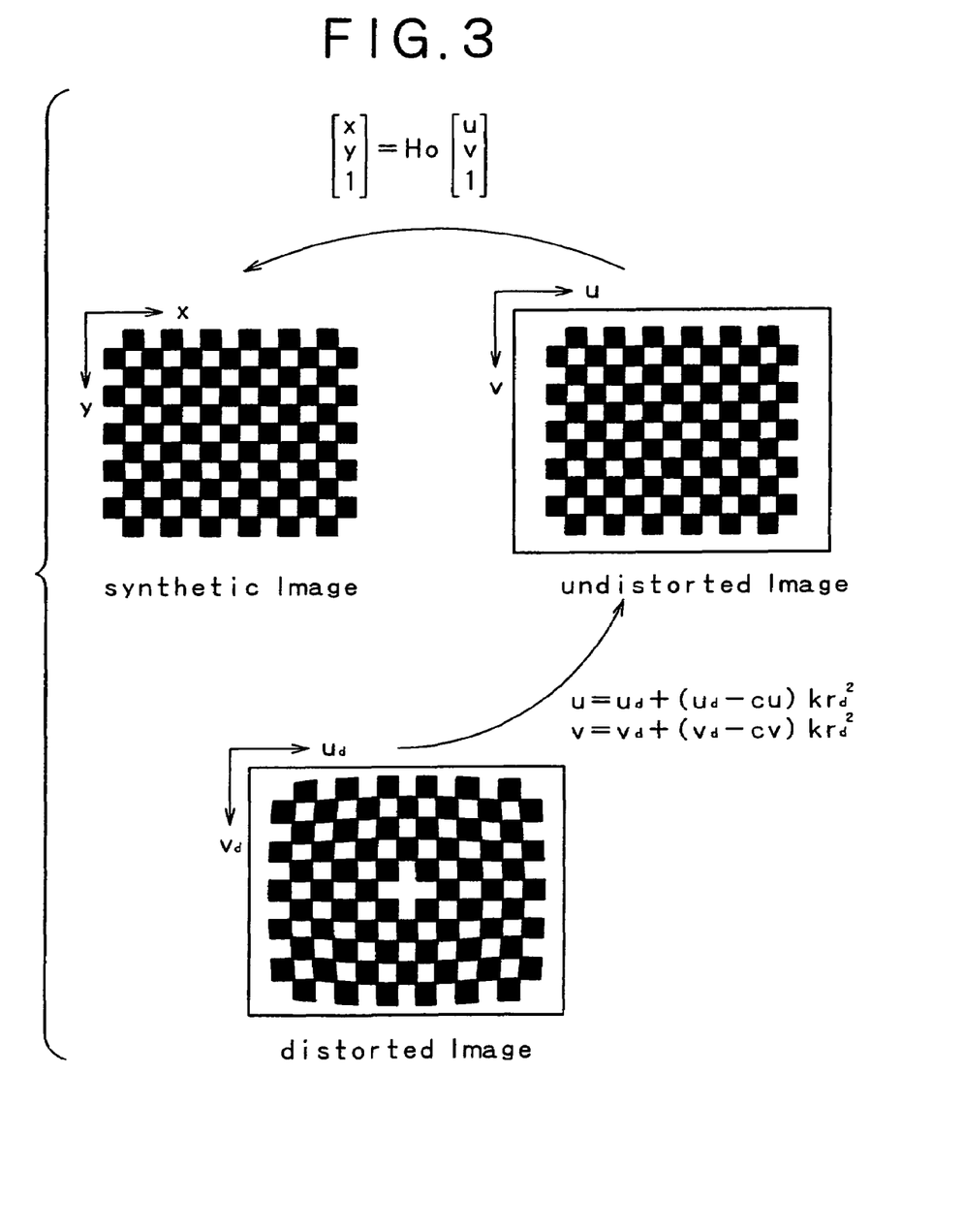
FIG. 3 shows the relationship among a point $m_o=[X_o, Y_o]^T$ on a synthetic image, a point $m_d=[ud, vd]^T$ on a distorted shot image, and a point $m=[u, v]^T$ on an undistorted image.

The relationship among a point $m_o=[X_o, Y_o]^T$ on a synthetic image, a point $m_d=[ud,vd]^T$ on a distorted shot image and a point $m=[u,v]^T$ on an undistorted image can be expressed by a projective transformation matrix $H_o$ and distortion parameters (k, cu, cv, sv), as shown in FIG. 3. That is, the point $m_d$ on the distorted shot image is transformed into m by the use of equation (3) and then is further transformed by the following equation to be thereby related to the point $m_o$ on the synthetic image.

$$\tilde{m}o = Ho \square \tilde{m} \quad (7)$$

Figure 4:
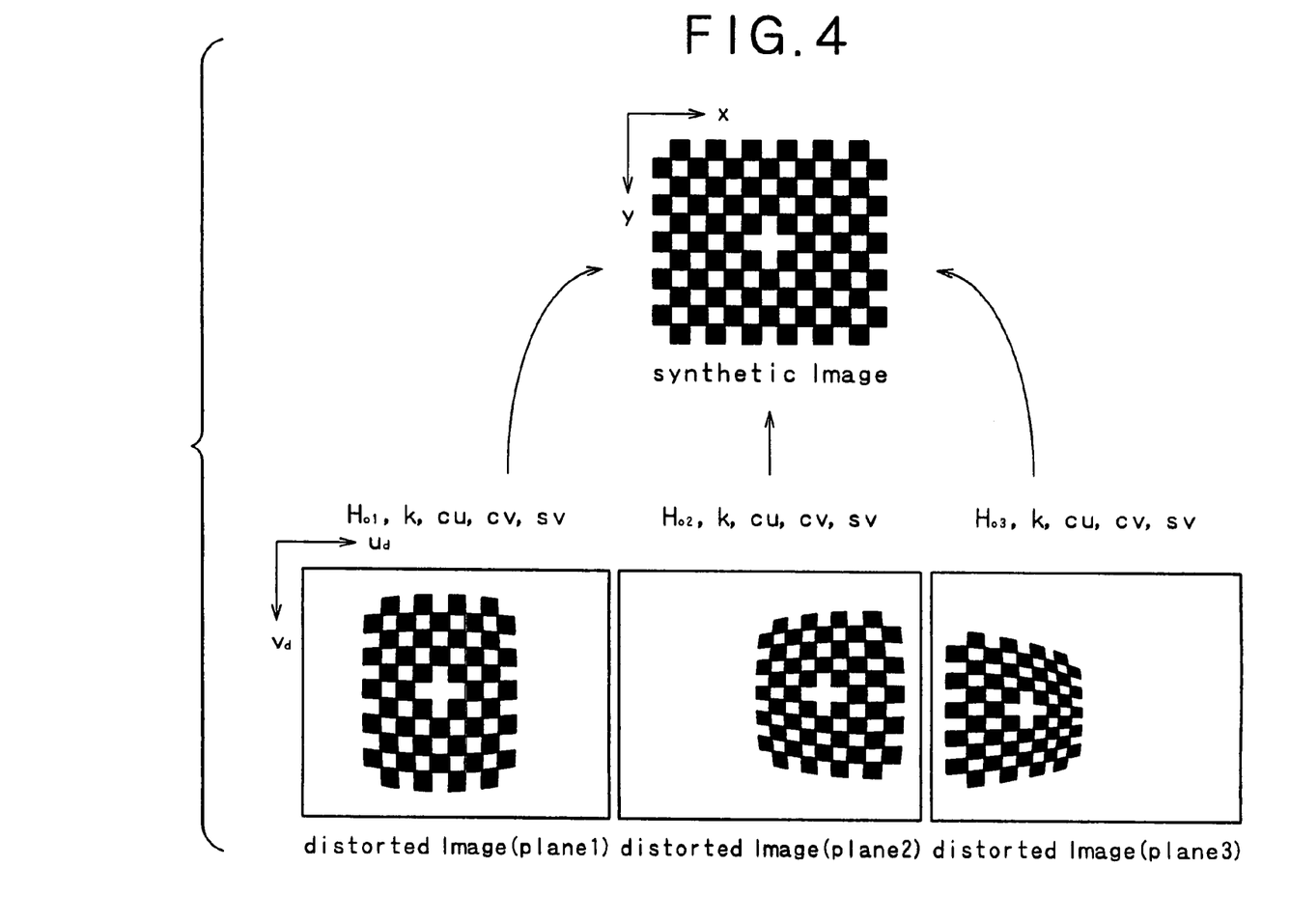
FIG. 4 illustrates how distorted shot images are registered to form one synthetic image.

As shown in FIG. 4, the shot images are registered to form one synthetic image on the basis of the relationship expressed by equation (7), so that parameters can be presumed. In this case, a total of 28 parameters are presumed, including distortion parameters (four parameters) and projective transformation matrixes $H_{oi}$ (eight parameters) from each shot image $I_i$ to the synthetic image $I_o$. As for estimated values, each of the parameters is presumed by minimizing the square sum of the synthetic image $I_o$ and the shot image $I_i$ as expressed by equation (8) shown below, wherein i (=1, 2, 3) denotes the number of images. Due to this processing, it becomes possible to presume the distortion parameters with relatively high stability even when the position of the shot pattern is local as shown in FIG. 4.

$$E = \sum_i \left[ \sum_j (Io(Xo, Yo) - Ii(ud, vd))^2 \right] \quad (8)$$

For minimizing the estimated value, it is possible to apply the Levenberg-Marquardt method (hereinafter referred to simply as L-M method) which is a general solution of nonlinear problems. This L-M method is described in, e.g., S. A. Teukolsky, W. T. Vetterling, B. P. Flannery, "NUMERICAL RECIPES in C" (W. H. Press).

Now the processing routine for presumption of distortion parameters will be summarized below.

1: To form a synthetic image $I_o$ in a computer in accordance with the images of a shot pattern;

2: To minimize the estimated value of equation (8) by the L-M method using the relationship between the shot images and the synthetic image expressed by equations (3) and (7) respectively with regard to the camera images $I_1, I_2, I_3$; and to calculate the distortion parameters k, cu, cv, sv and the projective transformation matrixes $H_{o1}$, $H_{o2}$, $H_{o3}$ for the synthetic image from the individual images (2) Presumption of Internal Parameters (Step S5)

The relationship between the virtual plane and the shot images used for presumption of the distortion parameters may be rewritten as follows according to equation (1).

$$sm = A[r1 \quad r2 \quad r3 \quad t]\begin{bmatrix} X \\ Y \\ 0 \\ 1 \end{bmatrix} \quad (9)$$

In the above, $R=[r1, r2, r3]$. The following equation can be derived from equations (9) and (7).

$$H=H_o^{-1}=A[r1 \ r2 \ t] \quad (10)$$

When $H=[h1 \ h2 \ h3]$, the following equation can be obtained from equation (10).

$$[h1 \ h2 \ h3]=\lambda A[r1 \ r2 \ t] \quad (11)$$

In the above, $\lambda$ denotes a scale factor, and r1 and r2 are orthonormal. Since $<r1, r2>=0$ and $|r1|=|r2|=1$, the following equation can be derived from equation (12).

$$h1^T Bh2=0$$

$$h1^T Bh1=h2^T Bh2 \quad (12)$$

In the above, $B=A^{-T}A^{-1}$. Also in equation (12), B denotes a symmetric matrix expressed as follows.

$$B = \begin{bmatrix} B11 & B12 & B13 \\ B12 & B22 & B23 \\ B13 & B23 & B33 \end{bmatrix}$$

The following equation can be obtained when the column vector $b=[B11, B12, B22, B13, B23, B33]^T$, and the H column vector $h_i=[h_{i1}, h_{i2}, h_{i3}]^T$. In this case, $vij=[h_{i1}h_{j1}, h_{i1}h_{j2}+h_{i2}h_{j1}, h_{i2}h_{j2}, h_{i3}h_{j1}+h_{i1}h_{j3}, h_{i3}h_{j2}+h_{i2}h_{j3}, h_{i3}h_{j3}]^T$.

$$h_i^T B h_j = v_{ij}^T b \quad (13)$$

Substituting equation (13) for equation (12), the following equation can be obtained with regard to the column vector b.

$$\begin{bmatrix} v_{12}^T \\ (v_{11} - v_{22})^T \end{bmatrix} b = 0 \quad (14)$$

Since equation (14) is an expression derived from a single image plane (projective transformation matrix), finally the following equation can be obtained by setting up equation (14) with respect to the entire shot images, and then it becomes possible to find the column vector b by solving equation (15) shown below.

$$Vb=0 \quad (15)$$

In the above, V is expressed as follows.

$$V = \begin{bmatrix} v1_{12}^T \\ (v1_{11} - v1_{22})^T \\ v2_{12}^T \\ (v2_{11} - v2_{22})^T \\ v3_{12}^T \\ (v3_{11} - v3_{22})^T \end{bmatrix} \quad (16)$$

If the vector b can be calculated according to equation (15), then each element of the internal parameters can also be calculated from the following equation.

$$v0=(B12 B13-B11 B23)/(B11 B22-B122))$$

$$\lambda=B33-[B132+V0(B12 B13-B11 B23)]/B11$$

$$\alpha=\sqrt{\lambda/B11}$$

$$\beta=\sqrt{\lambda \cdot B11/(B11 B22-12^2)}$$

$$\gamma=-B12\alpha 2\beta/\lambda$$

$$u0=\gamma \cdot V0/\alpha - B13\alpha^2/\lambda \quad (17)$$

Now the processing routine for presuming the internal parameters of the base camera will be summarized below.

1: To calculate the inverse matrix $H_i=H_{oi}^{-1}$ of the projective transformation matrix for the synthetic image;

2: To calculate the relation of equation (14) from each inverse matrix $H_i$;

3: To solve equation (15) obtained by using the entire matrixes $H_i$; and to calculate each element value of the internal parameters from equation (17)

(3) Presumption of Plane Position (Step S6)

Subsequently, the position and posture of the shot plane in space are presumed by using the internal parameters of the base camera calculated already.

Lattice points of the shot image can be extracted by using the inverse matrixes of the projective transformation matrixes $H_o$ from each shot image to the synthetic image calculated simultaneously with the distortion parameters. That is, a lattice point $m=[u,v]^T$ on the undistorted image can be calculated by projecting any lattice point on the synthetic image according to the matrix $H_o^{-1}$. (Since the synthetic image is a composite one, its position is known.)

Figure 5:
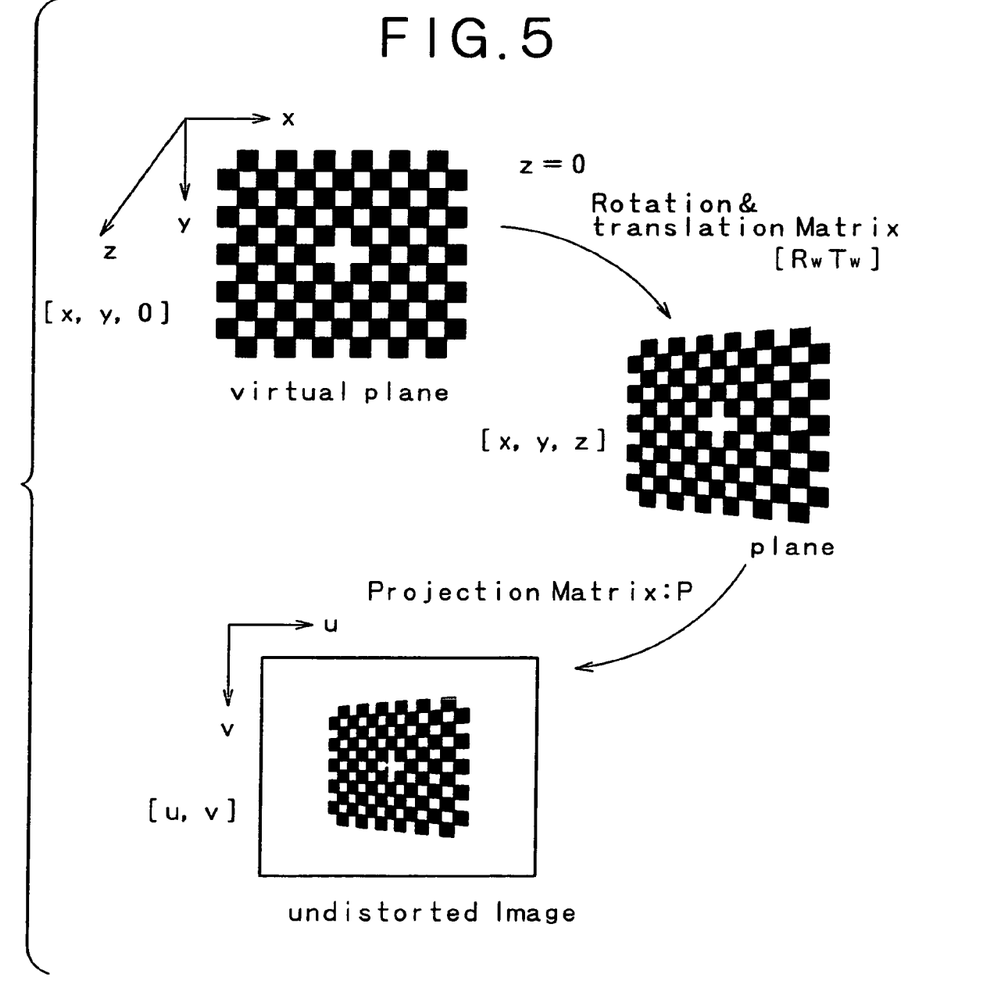
FIG. 5 shows the relationship between a lattice point m on an undistorted image and a point $M_o=[X,Y,O]^T$ on a virtual plane.

As shown in FIG. 5, the relationship between a lattice point m on an undistorted image and a point $M_o=[X,Y,0]^T$ on a virtual plane is such that the virtual plane is rotated and translated in space and is projected onto the shot plane of the base camera according to the projection matrix P for the base camera 1. Denoting the rotation and translation of the virtual plane in space by a matrix [Rw tw], the relationship between the points m and $M_o$ is expressed as $$\tilde{m} = P \cdot D \cdot \tilde{M}_o \quad (18)$$

The matrix D in the above is as follows.

$$D = \begin{bmatrix} RW & tW \\ 0^T & 1 \end{bmatrix} \quad (19)$$

Then the following equation is derived by modifying equation (18).

$$\tilde{M} = D\tilde{M}_o$$

Since the point M represents the space coordinates of the point on the shot plane, the plane position can be determined by presuming the matrix [Rw tw], hence enabling calculation of the space coordinates of the lattice point on the shot plane.

As shown in equation (20) below, the matrix [Rw tw] denotes a total of six freedom degrees including rotation angles ($\theta 1$, $\theta 2$, $\theta 3$) around each axis and translations (tx, ty, tz).

$$[Rw \quad tw] = \qquad (20)$$

$$\begin{bmatrix} \cos\theta 1\cos\theta 2 & \sin\theta 1\cos\theta 2 & -\sin\theta 2 & tx \\ \cos\theta 1\sin\theta 2\sin\theta 3 - \sin\theta 1\cos\theta 3 & \sin\theta 1\sin\theta 2\sin\theta 3 + \cos\theta 1\cos\theta 3 & \cos\theta 2\sin\theta 3 & ty \\ \cos\theta 1\sin\theta 2\cos\theta 3 + \sin\theta 1\sin\theta 3 & \sin\theta 1\sin\theta 2\cos\theta 3 - \cos\theta 1\sin\theta 3 & \cos\theta 2\cos\theta 2 & tz \end{bmatrix}$$

Calculation of a projection matrix P can be executed by using the internal parameters A calculated already and external parameters evaluated in accordance with the measurement range. For example, when the position of the base camera 1 is $C_b = [xc, yc, zc]^T$, the projection matrix P can be calculated according to equation (21) shown below.

$$P = A \begin{bmatrix} 1 & 0 & 0 & xc \\ 0 & 1 & 0 & yc \\ 0 & 0 & 1 & zc \end{bmatrix} \qquad (21)$$

The six parameters tr=[θ1, θ2, θ3, tx, ty, tz] given by equation (20) can be presumed according to the aforementioned L-M method with the following equation representing the estimated values.

$$E = \sum_j (m_j - \hat{m}_j)^2 \qquad (22)$$

Equation (22) expresses the total sum of the square of the difference between the lattice point $m_j$ on the shot image from the base camera 1 and the point projected according to equation (18). Such presumption according to equation (22) is executed with regard to each shot plane, so that it becomes possible to obtain the rotation and translation parameters Rw1, Rw2, Rw3, tw1, tw2 and tw3 of the virtual plane in space.

(4) Calculation of Projection Matrix for Detection Camera (Step S7)

Using the rotation and translation parameters Rw1, Rw2, Rw3, tw1, tw2 and tw3 of the virtual plane in space calculated already, the aforementioned conditions of equation (1) can be satisfied by the relationship between the point $m'_i = [u'_i, v'_i]^T$ on the detection camera and the point $M_i = [X_i, Y_i, Z_i]^T$ on the shot plane obtained by transforming the point on the virtual plane by $D_i$. And further the next equation can be derived therefrom.

$$\begin{bmatrix} v_{11} \\ v_{21} \\ v_{12} \\ v_{22} \\ v_{13} \\ v_{23} \end{bmatrix} p' = 0 \qquad (23)$$

In the above, $v_{1i}$ and $V_{2i}$ satisfy the conditions of equation (24) given below. Also in equation (23), the vector p' denotes each element of the projection matrix P' for the detection camera 2, as shown in equation (25).

$$v1_i = [\; X_i \; Y_i \; Z_i \; 1 \; 0 \; 0 \; 0 \; 0 \; -u_i'X_i \; -u_i'Y_i \; -u_i'Z_i \; u_i' \;] \qquad (24)$$
$$v2_i = [\; 0 \; 0 \; 0 \; 0 \; X_i \; Y_i \; Z_i \; 1 \; -v_i'X_i \; -v_i'Y_i \; -v_i'Z_i \; -v_i' \;]$$

$$P' = \qquad (25)$$
$$[p11, p12, p13, p14, p21, p22, p23, p24, p31, p32, p33, p34]^T$$

The projection matrix P' for the detection camera can be obtained by solving equation (23).

(5) Optimization of Parameters (Step S8)

Finally, all the parameters A, Rw1, Rw2, Rw3, tw1, tw2, tw3 and P' calculated at the previous processing steps are optimized by using the entire images obtained from the base camera 1 and the detection camera 2.

An estimating expression is given by equation (26) shown below, and it can be solved by the aforementioned L-M method. In this equation, i (=1, 2, 3) denotes an image number, and j (=1, 2, ..., n) denotes the number of points on each image. Each point in equation (26) signifies the one projected according to equation (27).

$$E = \sum_i \sum_j \left( (m_{ij} - \hat{m}_{ij})^2 + (m'_{ij} - \hat{m}'_{ij})^2 \right) \qquad (26)$$

$$\tilde{\hat{m}}_{ij} = A[R \; t] \begin{bmatrix} Rwi & twi \\ 0^T & 1 \end{bmatrix} \begin{bmatrix} X \\ Y \\ 0 \\ 1 \end{bmatrix}$$

$$\tilde{\hat{m}}'_{ij} = P' \begin{bmatrix} Rwi & twi \\ 0^T & 1 \end{bmatrix} \begin{bmatrix} X \\ Y \\ 0 \\ 1 \end{bmatrix} \qquad (27)$$

In the above, the matrix [R,t] denotes external parameters which indicate the position of the base camera 1 and are determined in accordance with the measurement range as mentioned.

Figure 6:
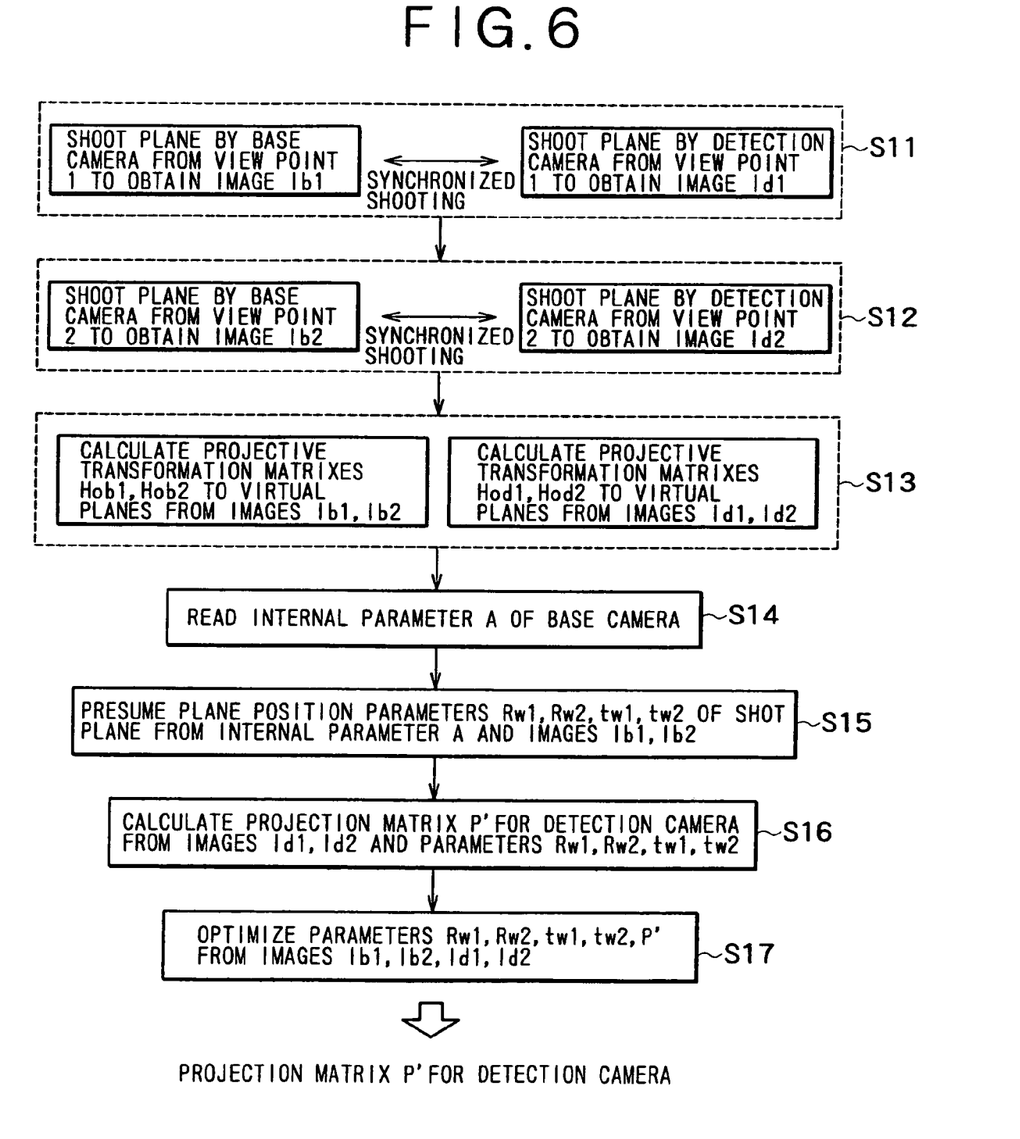
FIG. 6 is a flowchart showing a processing routine of parameter correction.

FIG. 6 is a flowchart showing a processing routine of parameter correction.

In the parameter correction, first a plane having a predetermined pattern drawn thereon is shot from two different view points (steps S11 to S12). In shooting the plane, the base camera 1 and the detection camera 2 are synchronized with each other (or, even though the two cameras are not kept in synchronism, other shooting conditions such as the positional relation of the pattern and so forth need to be mutually coincident). In such shooting, no restriction is existent with regard to the plane position in space (or the view point), and there is no particular restriction with respect to the pattern either. It is supposed that, in the following detailed description, a black-and-white binary lattice pattern is employed to execute the processing routine.

The parameter correction is executed on the premise that only the positional relationship between the cameras is changed while the internal parameters of the cameras remain unchanged. In such a case, considering the coordinate system on the basis of the position of the base camera 1 after change of the positional relationship, it is possible to regard the condition as a situation where only a positional change has occurred in the detection camera 2. That is, the parameters to be corrected are merely the 3×4 projection matrixes P' for projecting the space point to the detection camera 2, while the distortion parameters and the internal parameters of the base camera 1 are processed as fixed values.

Subsequently at step S13, projective transformation matrixes $H_{ob1}$, $H_{ob2}$, $H_{od1}$, $H_{od2}$ for the synthetic image are calculated from the images picked up by the cameras 1 and 2. In actual processing, such calculation is executed in conformity with the aforementioned routine of "(1) Presumption of distortion parameters." However, none of distortion parameters is presumed at this step.

Then the internal parameter A of the base camera 1 is read from the parameter calculated in the preceding calibration (step S14). At next step S15, the position of the shot plane is presumed by using the internal parameter. (Refer to "(3) Presumption of plane position.").

Thereafter, at step S16, the projection matrixes P' for the detection camera 2 are calculated by using the plane parameters Rw1, Rw2, tw1, tw2 presumed at step S15. It is possible to omit execution of this step S16 by using the projection matrixes stored in the parameter storage 7. However, in case the positional change of the camera is great, a long time may be required to absorb the displacement at the next step of optimization, or such absorption may be impossible. For this reason, it is preferred that step S16 be executed for the purpose of reducing the required time for optimization.

Finally, the parameters Rw1, Rw2, tw1, tw2 and P' are optimized (step S17) by using the entire images obtained from the base camera 1 and the detection camera 2. The estimated values at this step are given by equation (26) (where the number of images to be used is two). And each point in equation (26) is to be projected according to equation (27).

Thus, as described, the camera calibration method and device of the present invention are capable of calculating the parameters that represent the characteristics of the cameras.

Also, the camera calibration method and device of the present invention are adapted for simply carrying out camera calibration in a stereo system merely by shooting a known pattern on a plane with the cameras from different directions without any positional restriction on the plane.

Further, the camera calibration method and device of the invention are capable of simply carrying out camera calibration in stereography by the use of an arbitrary plane without any spatial positional restriction. Consequently, there exists no restriction in the positional relation of the shot plane to thereby eliminate the necessity of any exclusive appliance.

Shooting the data can be performed by moving either the camera or a wall, plate or the like where a patterned sheet outputted from a printer, for example, is attached, hence simplifying the preparation for calibration.

Presumption of distortion parameters and extraction of lattice points are executed by registering the entire images to compose a synthetic image, so that such presumption and extraction are achievable with relatively high stability.

Since the distortion parameters are presumed from the entire shot images, presumption of the parameters can be performed with relatively high stability even in case the shot object is small and its image obtained is merely partial.

For example, in the case of extracting lattice points regardless of any harmful influence of the distortion and adding the distortion parameters finally to optimize the parameters, there exists a possibility that, if the lens employed has a great distortion aberration, presumption of each parameter fails to be performed properly. However, the camera calibration device and method of the present invention ensure exact presumption of the distortion parameters simultaneously with extraction of the lattice points, thereby achieving stable presumption of the parameters even if the lens has a great distortion aberration.

Moreover, according to the camera calibration device and method of the present invention, it is possible to correct the parameters once calculated. In this case, preparation of data can be rendered easy, since the images obtained at two different view points are usable.

Further, the camera calibration device and method of the present invention employ a known pattern to carry out calibration, thereby enhancing the processing stability.

Although the present invention has been described hereinabove with reference to some preferred embodiments, it is not limited to such embodiments alone and a variety of other modifications and substitutions will be apparent to those skilled in the art without departing from the spirit or scope of the present invention. That is, the present invention has been disclosed merely in an attempt to be illustrative, and not restrictive. Therefore, it is to be understood that the scope of the present invention is determined solely by the hereafter appended claims.

We claim:

1. A camera calibration device for calibrating a stereo system, which includes a base camera and a detection camera, the device comprising:

an image holding device for holding images, said images obtained with the base camera and the detection camera at at least three view points free from any spatial positional restriction; and a parameter calculating device for calculating parameters necessary for distance measurement in the stereo system based on the images held by the image holding part, the parameter calculating device including a first part for presuming distortion parameters of the base camera and the detection camera by the use of the shot images, a second part for calculating projective transformation matrixes to project the shot images respectively onto predetermined virtual planes, a third part for calculating internal parameters of the base camera on the basis of the projective transformation matrixes obtained by the second part with regard to the images from the base camera, wherein said third part calculates said internal parameters of the base camera without camera position information, a fourth part for presuming the position of the shot plane based on both the internal parameters of the base camera calculated by the third part and the images obtained from the base camera, and a fifth part for calculating projection matrixes for the detection camera based on both parameters of the plane position presumed by the fourth part and the images obtained from the detection camera.

2. A camera calibration device as claimed in claim 1, further comprising:
   a parameter correcting device for optimizing the plane position parameters and the projection matrixes for the detection camera based on more than two images obtained from the base camera and the detection camera and held by the image holding device.

3. A camera calibration device as claimed in claim 2, wherein the parameter correcting device comprises:
   a sixth part for calculating projective transformation matrixes to project the images respectively onto predetermined virtual planes;
   a seventh part for presuming the position of the shot plane based on both the internal parameters of the base camera and the images obtained from the base camera;
   an eighth part for calculating projection matrixes for the detection camera based on both parameters of the plane position presumed by the seventh part and the images obtained from the detection camera; and
   a ninth part for optimizing the plane position parameters and the projection matrixes for the detection camera based on the shot images.

4. A camera calibration device as claimed in claim 1, wherein at least one of the distortion parameters and the projective transformation matrixes are calculated through a process of image registration which registers the individual images in a manner to form a predetermined synthetic image.

5. A camera calibration method for calibrating a stereo system, which includes a base camera and a detection camera, by using images obtained with the individual cameras at at least three view points free from any spatial positional restriction, the method comprising the steps of:
   presuming distortion parameters of the base camera and the detection camera by using the images thus obtained;
   calculating projective transformation matrixes to project the images respectively onto predetermined virtual planes;
   calculating internal parameters of the base camera based on the projective transformation matrixes obtained during the step of calculating projective transformation matrixes with regard to the images from the base camera, wherein said internal parameters are calculated without camera position information;
   presuming the position of the shot plane based on both the internal parameters of the base camera calculated at the step of calculating internal parameters and the images obtained from the base camera; and
   calculating projection matrixes for the detection camera based on both parameters of the plane position presumed at the step of presuming and the images obtained from the detection camera.

6. A camera calibration method as claimed in claim 5, further comprising the step of:
   optimizing the plane position parameters and the projection matrixes for the detection camera based on more than two images obtained from the base camera and the detection camera.

7. A camera calibration method as claimed in claim 6, wherein the step of optimizing the plane position parameters comprises the steps of:
   calculating further projective transformation matrixes to project the images respectively onto predetermined virtual planes;
   presuming further the position of the shot plane based on both the internal parameters of the base camera and the images obtained from the base camera;
   calculating further projection matrixes for the detection camera based on both parameters of the plane position presumed during the step of presuming and the images obtained from the detection camera; and
   optimizing further the plane position parameters and the projection matrixes for the detection camera based on the shot images.

8. A camera calibration method as claimed in claim 5, wherein at least one of the distortion parameters and the projective transformation matrixes are calculated through a process of image registration which registers the individual images in a manner to form a predetermined synthetic image.

* * * * *